United States Patent [19]

Arfaei

[11] Patent Number: 4,948,429

[45] Date of Patent: Aug. 14, 1990

[54] METHOD OF CONTROLLING AIR ENTRAINMENT IN CONCRETE COMPOSITIONS

[75] Inventor: Ahmad Arfaei, Milford, N.H.

[73] Assignee: W. R. Grace & Co.-Conn., Lexington, Mass.

[21] Appl. No.: 366,908

[22] Filed: Jun. 14, 1989

[51] Int. Cl.$^5$ .............................................. C04B 24/00
[52] U.S. Cl. ..................................... 106/659; 106/677
[58] Field of Search .................. 106/90, 102, 104, 93, 106/85

[56] References Cited

U.S. PATENT DOCUMENTS

| | | | |
|---|---|---|---|
| 3,232,777 | 2/1966 | Bush | 106/90 |
| 3,615,785 | 10/1971 | Moorer et al. | 106/90 |
| 3,856,701 | 12/1974 | Householder | 252/358 |
| 4,209,336 | 6/1980 | Previte | 106/90 |
| 4,814,014 | 3/1989 | Arfaei | 106/90 |

Primary Examiner—William R. Dixon, Jr.
Assistant Examiner—Alan Wright
Attorney, Agent, or Firm—John J. Wasatonic; Celia H. Ketley; William L. Baker

[57] ABSTRACT

A method of controlling the level of entrained air in hydraulic cement compositions is disclosed comprising the sequential steps of preparing a hydraulic cement composition in the form of an aqueous slurry containing an air entraining plasticizer and a defoamer, and increasing the air content of the composition by adding to said composition an air entraining agent. This method prevents undesired air entrainment, while allowing controlled amounts of air to be entrained if desired for freeze/thaw durability.

14 Claims, No Drawings

METHOD OF CONTROLLING AIR ENTRAINMENT IN CONCRETE COMPOSITIONS

BACKGROUND OF THE INVENTION

This invention pertains to a method of controlling the level of entrained air in hydraulic cement compositions. More particularly, this invention relates to a method wherein certain defoaming agents are used which prevent undesired air entrainment, while still permitting the subsequent entrainment of a controlled amount of air if desired for freeze/thaw durability.

Among the various materials added to hydraulic cement compositions such as Portland cement concretes are those which have been found able to affect the interaction between the water and the cement particles in the composition. For instance chemical additives have been used for some time which act to render the wet hydraulic mix more "plastic" at a given proportion of water to cement in the hydraulic mix, or conversely to allow less water to be used in the mix to obtain a given plasticity. These plasticizing materials are referred to as either "water reducing agents" or superplasticizers. Thus, "water reducing agent" and "superplasticizer" are terms of art which reference the relative water-reducing ability of a material. Water reducing agents provide a water reduction capability of 5% to 12% (ASTM-C494, Type A or Type D), while superplasticizers provide water reduction in excess of 12% (ASTM-C494, Type F or Type G). For brevity and convenience, both the water reducing agents and superplasticizers are collectively referred to herein as plasticizers.

The ability of certain chemical additives to reduce the amount of mix water required to obtain a given plasticity, or "slump" as it is referred to in the art, has led to the valuable utility of these materials as compressive strength-enhancing additives for hydraulic cements. It is well established that other factors being equal, a reduction in the amount of the water employed relative to the cement in the mix (the w/c ratio) will lead to an increase in the extended compressive strength of the hydrated cement compositions as usually measured 28 days after the preparation of the cement mixture. Among the various chemical materials which have been employed as strength-enhancing plasticizers are carbohydrates, such as saccharides and polysaccharides, starch and derivatives thereof such as pregelatinized starch, dextrin, cornsyrup, etc.; naphthalene sulfonic acid-formaldehyde condensate polymers and melamine sulfonate formaldehyde condensate polymers and salts thereof; polyhydroxy polycarboxylic compounds such as tartaric acid and mucic acid; lignosulfonic acid and salts therof, for example, sodium lignosulfonate; and polyethers having grafted polyacrylic acid side chains. These substances are effective as plasticizing, strength enhancing additives since they produce no side effects deleterious to strength, although many of these materials will also act to retard the setting time of the hydraulic cement mixture. These materials therefore are normally used in conjuction with a set accelerator such as calcium chloride or a formate salt to offset the retardation effect in instances where such retardation is not also a desired effect.

Since these additives have the ability to reduce surface tension in water they also often increase the plasticity of wet hydraulic cement mixes by entraining air in the wet mix. The art has long recognized this utility of air entraining plasticizers in applications where large amounts of entrained air may be tolerated in order to obtain high plasticity. The increased air entrained during mixing due to the presence of such plasticizers is normally retained in the final hydrated product, and thus another wide use for surface active materials in the hydraulic cement art has been as air-entraining agents for the hydrated cement product to render it more durable and resistant to freeze-thaw cycles. However, the amount of air entrained by these plasticizers is often deleterious to the compressive strength of the final set product.

Thus, it would be particularly advantageous to be able to control the amount of air entrained depending on the properties desired, i.e. to entrain more air when freeze-thaw resistance is needed, less when maximum compressive strength is required. Using conventional air entraining plasticizers, the level of entrained air is difficult to control, may be unacceptably high at useful dosages, and will vary depending on the dosage and the particular additive used.

It is known to use defoamers in conjuction with air entraining additives such as plasticizers in concrete compositions in order to prevent or decrease the entrainment of air during the mixing of the concrete. However, in mixes containing defoamers, if some air entrainment is desired in order to impart freeze/thaw durability to the set concrete, it is generally not possible to subsequently entrain air into these compositions, even if an air entraining agent is added.

SUMMARY OF THE INVENTION

According to this invention, it has been found that certain defoamers are capable of not only preventing the uncontrolled entrainment of air occuring with the addition of certain plasticizers to hydraulic cement compositions, but also allow a controlled amount of air to be later introduced, if desired, by the further addition of air entraining agents. More particularly, it has been found that acetylenic diols, and reaction products thereof with alkylene oxides, when added to cement compositions containing air entraining additives such as lignin or graft copolymers of polyethers and acrylic acid, significantly reduce the level of entrained air, without counteracting the effectiveness of air entrainers which may be later added in order to introduce a controlled amount of air.

Accordingly, in its method aspects, the present invention is directed to a method comprising the sequential steps of preparing an aqueous hydraulic cement-based slurry by admixing water, a hydraulic cement, an air-entraining plasticizer, and a defoamer selected from the group consisting of acetylenic diols and reaction products thereof with alkylene oxides; and adjusting the air content of the composition by adding to said composition an air entraining agent.

The present invention is further directed to air entrained hydraulic cement compositions comprising hydraulic cement, a plasticizer, a defoamer selected from the group consisting of acetylenic diols and reaction products therof with alkylene oxides, and an air entraining agent.

DETAILED DESCRIPTION OF THE INVENTION

According to the method of this invention, a hydraulic cement composition is prepared comprising a material which normally is air entraining, e.g., an air entraining plasticizer such as a lignosulfonate salt, and a defoamer of the invention in an amount which offsets to a desired extent the air entrainment which would normally occur.

This cement composition may initially be prepared as a dry mix to which water is later added to prepare a fluid slurry or a slurry may be prepared and an additive comprising the air entraining plasticizer and defoamer added thereto.

In applications where maximum compressive strength is required, the hydraulic cement composition would be used without the further addition of an air entraining agent, so that the set concrete would contain very little air. In applications where lower compressive strength may be tolerated, and higher levels of freeze/thaw durability are desired, an air entraining agent is added subsequently to permit the entrainment of the desired level of air. Thus, an additive comprising an air entraining plasticizer and a defoamer according to the invention may be used when minimum air entrainment is desired, or in combination with a later added air entraining agent when air entrainment is desired.

The hydraulic cement composition of the invention comprises an hydraulic cement, an air entraining plasticizer, a defoamer selected from the group consisting of acetylenic diols and reaction products thereof with alkylene oxides, and an air entraining agent.

The air entraining plasticizer of the invention may be any plasticizer which entrains air, including but not limited to lignin and polyethers having grafted polyacrylic side chains. The amount of plasticizer used will depend upon the properties required, however the level of addition is normally in the range of from about 0.05% to 6% by weight, and preferably from about 0.1% to 0.5% by weight, based on the weight of hydraulic cement binder.

Defoamers which may be used in the present invention are acetylenic diol surfactants. Of these acetylenic diols, it is preferred to use those having a symmetrically substituted ten carbon backbone with a triple bond, two adjacent hydroxyl groups and four symmetrical methyl groups. The combination of the triple bond and the adjacent hydroxyl groups creates an area of high electron density, making the molecule polar and thus making it an excellent wetting agent. This allows these defoamers to reduce the surface tension of water, and reduce interfacial tension between liquids or between a liquid and a solid, thus effecting the interaction between the water and cement particles in the compositions of the invention. The high ratio of hydrophobic to hydrophilic constituents results in the defoaming properties of these additives. These preferred acetylenic diols are available commercially from Air Products and Chemicals, Inc., under the tradename "Surfynol". Particularly preferred defoamers for use in the present invention are Surfynol ®104E (50% 2,4,7,9-tetramethyl-5-decyn-4,7-diol dissolved in ethylene glycol), and Surfynol ®440 (40% ethylene oxide adduct to 2,4,7,9-tetramethyl-5-decyn-4,7-diol). Other similar acetylenic diol surfactants, and reaction products thereof with alkylene oxides, may also be used advantageously in the present invention. A generic formula for the preferred acetylenic diol defoamers is shown below:

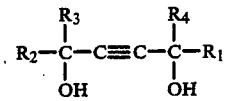

wherein $R_1$, $R_2$, $R_3$, and $R_4$ may independently be short chain branched or linear alkyl groups having from 1 to 10 carbon atoms. The acetylenic diol defoamer is generally present in the hydraulic cement composition in an amount ranging from about 0.10% to about 10% by weight based on the weight of the plasticizer, and preferably from about 1% to 5%. Preferred levels of addition depend on the plasticizer used, the water/cement ratio, and other formulation variables. The preferred level of defoamer is generally dictated by the amount of air which the plasticizer used in the composition would entrain without defoamer, and the level of air entrainment desired prior to addition of the air entraining agent. The preferred level of air entrainment of the hydraulic cement composition containing plasticizer and defoamer is generally from about 1% to about 3%.

Air entraining agents are conventionally used in hydraulic cement compositions, and are well known to those skilled in the art. Air entraining agents which may be used in the present invention include, but are not limited to tall oils. The preferred air entraining agent in the present invention is Airalon 20AEA ®. As in the case of the defoamer, the level of air entraining agent used will be dictated by the amount of air entrainment desired, the water/cement ratio, and the plasticizer/defoamer combination used in the hydraulic cement slurry. Generally the level of addition will range from 0.01% to 0.10% solids on solids based on the weight of the hydraulic cement binder. The air content of the composition after the addition of the air entraining agent may be varied by adjusting the dosage of said agent. Preferred air content is generally greater than 6%.

The combination of an acetylenic diol defoamer and an air entraining agent according to the invention is particularly valuable for adjustably controlling the level of air entrainment in Portland cement compositions, especially Portland cement concrete. Portland cement is by far the most widely used hydraulic cement. The term "hydraulic cement" as used herein includes those inorganic cements which, when mixed with water, set and harden as a result of chemical reactions between the water and the compounds present in the cement. The term "Portland cements" as used herein includes those products prepared by heating a mixture of limestone and clay or shale, or other calcareous and argillaceous materials to a fused state and grinding the fused product, which is called clinker, with a few percent, normally about 4 to 6 percent, of a retarder such as gypsum.

The term "concrete" as used herein includes a mixture of such hydraulic cements and inert aggregates. Typical aggregates include conventional aggregates such as gravel, sand, granite, limestone, and quartz sieve. Conventional hydraulic cement concretes, e.g. Portland cement concretes, employ major amounts, i.e. over 50%, usually up to about 75% by volume of such aggregates in the set product. Pozzalonic materials such as condensed silica fume and fly ash may also be included.

The method of the invention is especially suitable for use in preparing concrete compositions intended for structural uses where a balance of high compressive strength and freeze/thaw durability is sought. These concrete compositions employ water to cement ratios of less than 1, usually from about 0.4 to about 0.6, and when hardened have compressive strength values typically in excess of 2000 psi after 28 days of preparation.

The compositions of the invention can include conventional additional optional additives such as set accelerators, retarders, etc..

Generally in the present invention the defoamer is added to the hydraulic cement composition with the air entraining plasticizer, and the air entraining agent is added subsequently. However, if desired it is possible to add all three additives simultaneously. This may be advantageous if it is necessary to adjust the level of entrained air in the composition without varying the dosage of superplasticizer or defoamer.

In the Examples described below, Portland cements from various manufacturers were employed to make hydratable compositions. The cements all met ASTM standards for Portland cements. The concrete compositions were prepared according to ASTM C494 test procedures. Determinations of the amount of air entrained in the hydrated samples produced in the experiments below were made according to ASTM test procedure No. C231. Also, the "slump" of the wet mixes procuced in the experiments was determined according to ASTM test procedure No. C143. This is a measure of the relative consistency or plasticity of the wet mix. The compressive strength of the mixes given below was determined by preparing test specimens and curing in accordance with ASTM procedure No. C192. The compressive strengths of the specimens were measured after 1, 7 and 28 days with ASTM C39.

The Examples below are intended to be illustrative only of the present invention.

EXAMPLE 1

A series of Portland cement concrete compositions was prepared utilizing various admixtures in the proportions shown in Table 1. The proportions shown are percent solids on solids based on the weight of the hydraulic cement binder in the compositions. Composition 1, the blank, contains no defoamer, plasticizer or air entrainer. Compositions 2, 3, and 4 contain as the plasticizer a polyether having grafted polyacrylic acid side chains, prepared as described in Example 1 of U.S. Pat. No. 4,814,014. Composition 2 contains no defoamer, while compositions 3 and 4 contain Surfynol ®104E, commercially available from Air Products and Chemicals Inc.. In composition 4, subsequent to the addition of the defoamer and plasticizer, an air entraining agent commercially available from W. R. Grace & Co.-Conn. under the designation Airalon 20AEA ® was added in order to increase the level of entrained air. The compositions were all prepared at a water/cement ratio of 0.48 and a cement factor of 611.

TABLE 1

| Composition # | Polyether Copolymer | Acetylenic Diol Defoamer | Air Entrainer |
|---|---|---|---|
| 1 | — | — | — |
| 2 | 0.2 | — | — |
| 3 | 0.2 | 0.0036 | — |
| 4 | 0.2 | 0.0036 | 0.034 |

Each concrete composition containing the admixtures shown in Table 1 was then tested for slump, percent entrained air, and initial setting time. Compressive strength was tested after 1, 7, and 28 days. Results are shown in Table 2.

The results of Table 2 show the ability of compositions containing the defoamers of the invention to entrain air upon addition of an air entraining agent. The results of Table 2 also demonstrate the reduction in entrained air produced by the addition of a defoamer according to the invention to a composition containing an air entraining plasticizer, and the strength enhancement which results.

TABLE 2

| Composition # | % Entrained Air | Slump (Inches) | Initial Setting Time (hours:min.) | Compressive Strength | | |
|---|---|---|---|---|---|---|
| | | | | 1 day | 7 day (psi) | 28 day |
| 1 | 2.2 | 2.50 | 3:43 | 2523 | 5014 | 6345 |
| 2 | 5.2 | 7.13 | 5:12 | 2237 | 4516 | 5690 |
| 3 | 3.6 | 8.25 | 4:56 | 2527 | 4872 | 6089 |
| 4 | 8.2 | 8.50 | 5:36 | 1898 | 3936 | 4711 |

What is claimed is:

1. A method of preparing an air entrained cementitious composition comprising the sequential steps of:
   a. preparing an aqueous hydraulic cement-based slurry by admixing water, a hydraulic cement, an air entraining plasticizer, and a defoamer selected from the group consisting of acetylenic diols and reaction products thereof with alkylene oxides; and
   b. increasing the air content of the said composition by adding to said composition an effective air-entraining amount of an second air entraining agent.

2. The method of claim 1 wherein the defoamer is a compound having the generic formula:

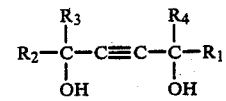

wherein $R_1$, $R_2$, $R_3$, and $R_4$ may independently be short chain branched or linear alkyl groups having from 1 to 10 carbon atoms.

3. The method of claim 1 wherein the defoamer is 2,4,7,9-tetramethyl-5-decyn-4,7-diol.

4. The method of claim 1 wherein the defoamer is present in an amount of from 0.10% to 10% by weight based on the weight of the plasticizer.

5. The method of claim 1 wherein the air entraining agent is tall oil.

6. The method of claim 1 wherein the air entraining agent is present in an amount of from 0.01% to 0.10% solids on solids based on the weight of hydraulic cement.

7. The method of claim 1 wherein the air content subsequent to addition of the air entraining agent is greater than 6%.

8. The method of claim 1 wherein the slurry is prepared by mixing the water and hydraulic cement and adding thereto an aqueous solution of the defoamer and the plasticizer.

9. A hydraulic cement composition in the form of an aqueous slurry comprising:
 a. a hydraulic cement binder;
 b. an air entraining plasticizer;
 c. a defoamer selected from the group consisting of acetylenic diols and reaction products thereof with alkylene oxides; and
 d. a second air entraining agent air.

10. The composition of claim 9 wherein the defoamer is a compound having the generic formula:

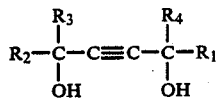

wherein $R_1$, $R_2$, $R_3$, and $R_4$ may independently be short chain branched or linear alkyl groups having from 1 to 10 carbon atoms.

11. The composition of claim 9 wherein the defoamer is 2,4,7,9-tetramethyl-5-decyn-4,7-diol.

12. The composition of claim 9 wherein the defoamer is present in an amount of from 0.003% to 0.035% solids on solids based on the weight of cement binder.

13. The composition of claim 9 wherein the air entraining agent is tall oil.

14. The composition of claim 9 wherein the air entraining agent is present in an amount of from 0.01% to 0.10% solids on solids based on the weight of cement binder.

UNITED STATES PATENT AND TRADEMARK OFFICE
CERTIFICATE OF CORRECTION

PATENT NO.  : 4,948,429

DATED       : August 14, 1990

INVENTOR(S) : Ahmad Arfaei

It is certified that error appears in the above-identified patent and that said Letters Patent is hereby corrected as shown below:

Col. 7 Claim 9, line 8, delete "d. a second air entraining agent air." and substitute --d. an effective air-entraining amount of a second air entraining agent.--

Signed and Sealed this

Twenty-ninth Day of December, 1992

Attest:

DOUGLAS B. COMER

*Attesting Officer*    Acting Commissioner of Patents and Trademarks